United States Patent
Alzen

(10) Patent No.: US 12,510,895 B2
(45) Date of Patent: Dec. 30, 2025

(54) SIGNAL INTERFERENCE REJECTION METHOD AND APPARATUS

(71) Applicant: Greenworks (Jiangsu) Co., Ltd., Changzhou (CN)

(72) Inventor: Jimmy Alzen, Granna (SE)

(73) Assignee: Greenworks (Jiangsu) Co., Ltd., Guangzhou (CN)

( * ) Notice: Subject to any disclaimer, the term of this patent is extended or adjusted under 35 U.S.C. 154(b) by 334 days.

(21) Appl. No.: 18/313,315

(22) Filed: May 6, 2023

(65) Prior Publication Data

US 2023/0273619 A1  Aug. 31, 2023

Related U.S. Application Data

(63) Continuation of application No. PCT/CN2020/136446, filed on Dec. 15, 2020.

(51) Int. Cl.
 *G05D 1/00* (2024.01)
 *A01D 34/00* (2006.01)

(52) U.S. Cl.
 CPC ......... *G05D 1/0265* (2013.01); *A01D 34/008* (2013.01)

(58) Field of Classification Search
 CPC .. G05D 1/0265; G05D 1/0219; G05D 1/0088; A01D 34/008; G01R 31/083; B60L 15/20; B60T 13/665; H04B 1/1027; G08B 21/06
 See application file for complete search history.

(56) References Cited

U.S. PATENT DOCUMENTS

| | | | | |
|---|---|---|---|---|
| 4,602,247 A * | 7/1986 | Seko | ...................... | G08B 21/06 180/272 |
| 9,072,219 B2 * | 7/2015 | Da Rocha | ............ | A01D 34/008 |
| 10,191,488 B2 * | 1/2019 | Franzius | ............... | G05D 1/0088 |
| 2009/0305653 A1 * | 12/2009 | Ojima | .................. | H04B 1/1027 455/213 |
| 2010/0049416 A1 * | 2/2010 | Harada | ................. | B60T 13/665 701/81 |
| 2013/0211704 A1 * | 8/2013 | Thompson | .............. | B60L 15/20 701/300 |
| 2014/0062497 A1 * | 3/2014 | Stephan | ............... | G01R 31/083 324/532 |
| 2016/0014955 A1 * | 1/2016 | Hans | .................... | A01D 34/008 901/41 |
| 2020/0401146 A1 * | 12/2020 | Strandberg | ........... | G05D 1/0219 |

* cited by examiner

*Primary Examiner* — Yuri Kan

(57) ABSTRACT

A method controls an apparatus comprising at least two sensors, and an active device interfering with signals detectable by the at least two sensors. The method comprises: detecting, by means of the at least two sensors, signals at different points in time, the signals including burst signals from a signal source, storing data indicative for the detected signals in a memory, comparing signal values determined based on the data indicative for the signals stored in the memory of three different points in time with one another to differentiate the signal values into a low signal value, an intermediate signal value and a high signal value, subtracting the intermediate signal value from a current signal value detected by means of at least one of the at least two sensors to obtain at least one processed signal value and controlling operation of the apparatus based on the processed signal value.

19 Claims, 4 Drawing Sheets

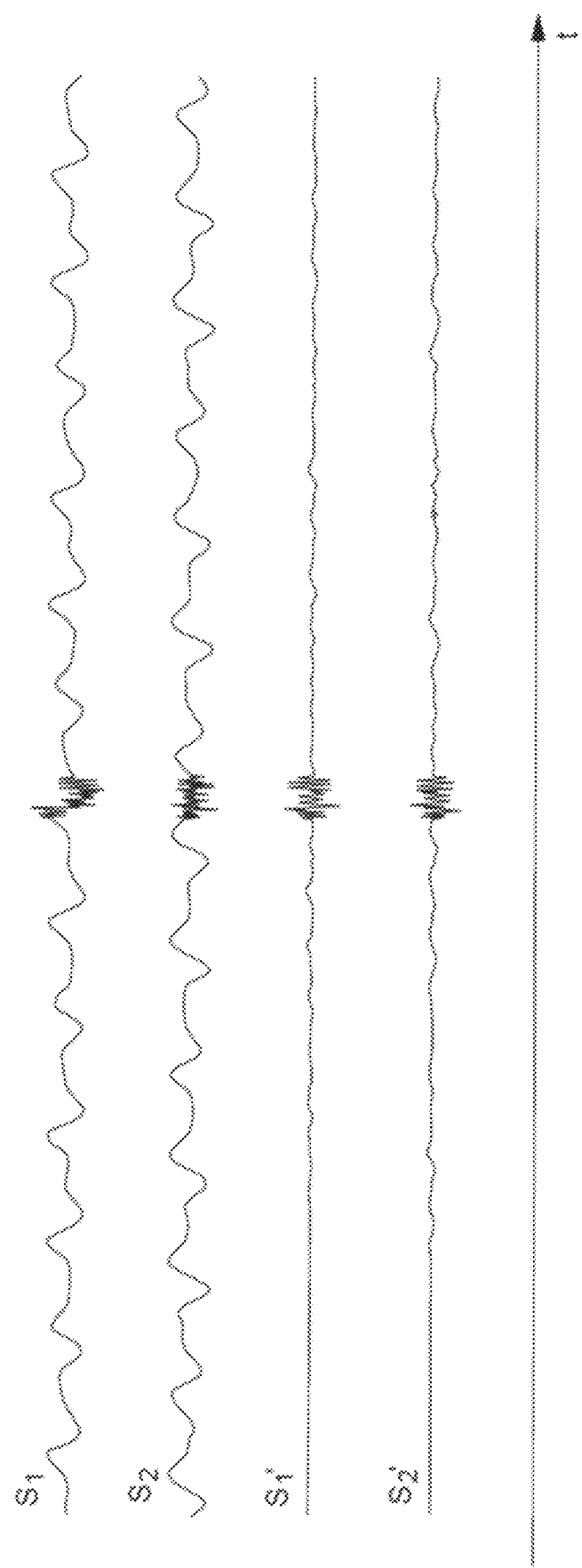

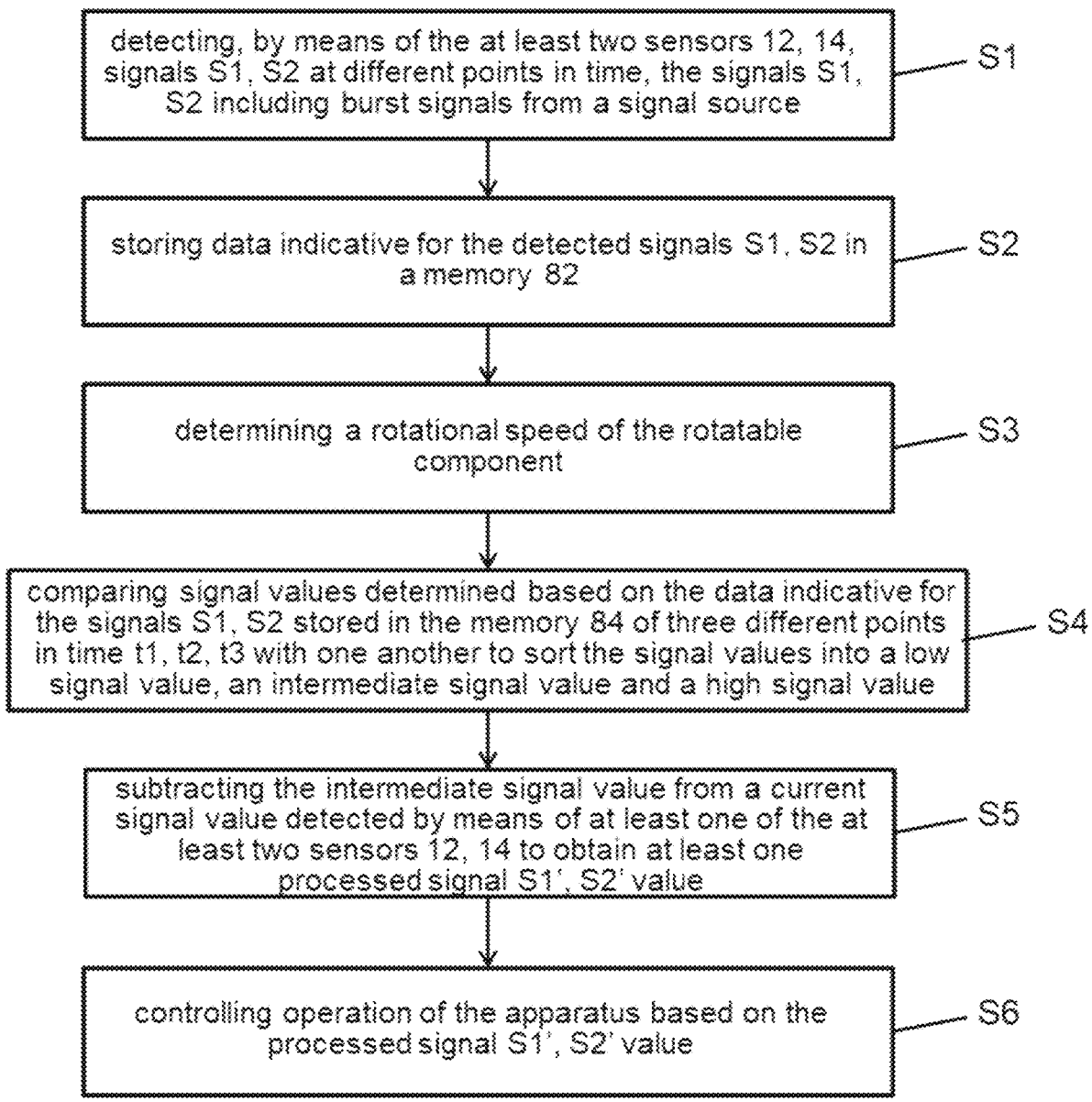

SIGNAL INTERFERENCE REJECTION METHOD AND APPARATUS

TECHNICAL FIELD

The present invention generally relates to a method for controlling an apparatus using detected signals, to an apparatus, e.g. a robotic mower, and to a system comprising such an apparatus.

BACKGROUND ART

Various apparatuses, particularly robotic mowers, are operated using signals received by the apparatus from an external signal source. The apparatus may comprise an active device that interferes with the signals so that the received signals are altered. This may deteriorate the quality of the signal-dependent operation of the apparatus.

Robotic mowers, also called self-propelled lawnmowers, are generally known. These robotic mowers are provided with a rechargeable battery. An area of a lawn may be defined by a boundary wire. The robotic mower may use signals transmitted by means of the boundary wire to determine its position, e.g., to navigate and stay within the area. When the remaining power in the battery is below a certain level the robotic mower is programmed to return to the charging station to recharge the battery. There are different possibilities for returning the robotic mower to the charging station. One possible method is that the robotic mower, upon a command to return to the charging station, continues its movement until the boundary wire is detected nearby and then follows the boundary wire to the charging station that is provided somewhere along the boundary wire. Another option when returning to the charging station is to use a guide wire, which the robotic mower follows back to the charging station.

The active device of the apparatus, e.g., a cutting device comprising an electric motor and a blade of the robotic mower, interferes with the signals from the signal source. For example, the electric motor creates electromagnetic noise and/or rotation of the blade may effect a distortion of the signals from the signal source received by the apparatus.

WO 2020/148138 A1 describes to use a digital signal processor to provide an output corresponding to an average of a plurality of recorded transmitted signal bursts to deal with noisy conditions. This solution requires comparably complex processing hardware that finds signal bursts in the noisy signal and averages the bursts. Further, the averaging needs to record signals over a relatively long time span what leads to rather long response times. In addition, noise contributions may remain in the averaged signal.

US 2018/0199506 A1 proposes to reduce the voltage for a cutting blade motor of a grass mower when a magnetic field is detected by a guide wire sensor, and to restart the cutting blade motor after detection of the magnetic field has completed. This allows to avoid interferences generated by the cutting blade motor, but at the cost of a reduced cutting efficiency.

CN 103 941 600 B describes an automatic working system that includes a noise detection device which detects noise signals in a surrounding space and generates a detection signal accordingly, and a control device which is electrically connected to the noise detection device and that receives the detection signal, and filters out environmental signals according to the detection signal to attenuate a part of a processed signal corresponding to the noise signal. Such solutions generally require a complex hardware setup.

SUMMARY

An object of the present invention is to provide an improved signal interference rejection.

According to an aspect of the present invention this object is achieved by a method for controlling an apparatus comprising at least two sensors and an active device interfering with signals detectable by the at least two sensors. The method comprises detecting, by means of the at least two sensors, signals at different points in time t1-t3, the signals including burst signals from an external signal source, storing data indicative for the detected signals in a memory, comparing signal values D1-D3 determined based on the data indicative for the signals stored in the memory of three different points in time t1-t3 with one another to differentiate, e.g. sort, the signal values D1-D3 into a low signal value, an intermediate signal value and a high signal value, subtracting the intermediate signal value from a current signal value detected by means of at least one of the at least two sensors to obtain at least one processed signal value, and controlling operation of the apparatus, e.g., navigating the apparatus, based on the processed signal value. These steps may be repeated iteratively, e.g., for each sample of a time-discrete, sampled sensor reading.

This is based on the idea to provide an improved signal interference rejection for an apparatus, in particular for a robotic mower, by using a stored reference signal value as a baseline which has no extreme value in comparison with two other stored values, so that the reference signal value used as the baseline likely does not contain a burst signal. This allows to reject noise signal interference effectively and with very short response times. Further, it is not necessary to interrupt an operation of the apparatus for the signal detection. At least one of the low signal value, the intermediate signal value and the high signal value may be determined using a first one of the at least two sensors, and at another one of the low signal value, the intermediate signal value and the high signal value may be determined using a second one of the at least two sensors.

According to an embodiment the active device comprises a rotatable component being rotatable about a rotational axis. Optionally, the method further comprises determining a rotational speed of the rotatable component. The rotatable component may be a source of periodic noise for the signals detected by the at least two sensors. The periodic noise may interfere with the burst signals. By determining the rotational speed the selection of the three different points in time may be improved.

According to an embodiment the rotatable component is a blade and/or the active device comprises a motor, in particular an electric motor. For example, the motor is configured to rotate the blade. The apparatus may be a robotic mower. The motor and/or the blade may be sources of noise. By applying the method described herein it is possible to use a motor and/or a blade that create relatively strong noise, but subtract the noise components from the detected signals. This allows for a wider choice in the selection of the components used for manufacturing the apparatus and, in turn, reduced manufacturing effort and costs.

According to an embodiment the method further comprises determining a first time offset and a second time offset. Optionally, the second time offset is smaller than the first time offset. This allows a simple determination of the different points in time.

The active device may be designed such that it creates a periodic electromagnetic signal, particularly as an unwanted side effect. The periodic signal may interfere with the bust signals. The method and apparatus described herein allow to subtract this interference.

The at least two sensors comprise a first sensor and a second sensor. According to an embodiment the first time offset is the time of one, two or more complete revolution(s) of the rotatable component about the rotational axis, and/or the second time offset is the time to rotate a portion of the rotatable component from being closest to the first sensor to being closest to the second sensor. This allows for a particularly effective selection of a reference signal for noise subtraction. For example, the first time offset T1 may be equal to the time for one revolution, e.g., of a motor, e.g. cutting motor, and/or disc, e.g. cutting disc. The second time offset T2 can be equal to the time for a part of one revolution, e.g., depending on the number of blades on the cutting disc and/or the number of poles in the motor. For the example of a three-bladed cutting disc, the second time offset T2 may be equal to the first time offset divided by three, T1/3.

According to an embodiment the three different points in time t1-t3 comprise a, e.g. first, point in time t1 at the first time offset T1 before a current time T, t1=T−T1, a, e.g. second, point in time t2 at the second time offset T2 before the current time T, t2=T−T2, and/or a, e.g. third, point in time t3 at the first time offset T1 plus the second time offset T2 before the current time T, t3=T−(T1+T2). For example, the blade rotates in the direction from the first sensor towards the second sensor. Alternatively it rotates in the opposite direction.

According to an embodiment the compared signal values D1-D3 comprise a first signal value D1 determined at the first point in time t1, a second signal value D2 determined at the second point in time t2, and a third signal value D3 determined at the third point in time t3. This allows to further improve the noise subtraction.

Optionally the first signal value D1 is determined using the first sensor, the second signal value D2 is determined using the second sensor, and/or the third signal value D3 is determined using the second sensor.

According to an embodiment the signal values D1-D3 are signal strengths of the corresponding signals at the respective points in time t1-t3.

According to an embodiment, an apparatus is provided. The apparatus comprises at least two sensors and an active device interfering with signals detectable by the at least two sensors. The apparatus is adapted to detect, by means of the at least two sensors, signals at different points in time t1-t3, the signals including burst signals from a signal source, store data indicative for the detected signals in a memory, compare signal values D1-D3 determined based on the data indicative for the signals stored in the memory of three different points in time t1-t3 with one another to differentiate, e.g. sort, the signal values D1-D3 into a low signal value, an intermediate signal value and a high signal value, subtract the intermediate signal value from a current signal value detected by means of at least one of the at least two sensors to obtain at least one processed signal value and control its operation based on the processed signal value.

Regarding the advantages of the apparatus reference is made to the above description of the method for controlling the apparatus.

According to an embodiment the at least two sensors comprise a first sensor and a second sensor. Optionally, one or each of the first and second sensors, is or are adapted to sense a magnetic field.

According to an embodiment the apparatus comprises a main body, and the first sensor and the second sensor are arranged at the main body displaced with respect to one another. By this arrangement the interference of the active component at a certain point in time with the signals detected by the first and second sensors may be different.

According to an embodiment the active device comprises a component being rotatable about a rotational axis. Optionally, the first and second sensors are arranged so that the rotational axis and the first and second sensors define a quarter circle or less than a quarter circle of a circle around the rotational axis as the center of the circle. More generally, together, the first and second sensors may describe an angle α with respect to the rotational axis. The ratio of the second time span divided by the first time span, T2/T1, may be equal to the ratio of this angle α and a full circle, α/360 degrees. This allows to filter out noise regular noise components particularly effectively.

For example, the active device comprises a motor and a blade rotatable by the motor.

Optionally, the blade comprises a magnetic material. Using the above-described method it is possible to easily filter out signal components induced by such a magnetic blade. Blades may be magnetic due to the alloy used and/or due to manufacturing conditions. Avoiding blades to be magnetic may significantly increase the manufacturing complexity and limit the choice of the material. Filtering out the interference by means of software may thus simplify the manufacturing and allow a wider choice in the materials for the blades.

According to an embodiment the apparatus is a robotic mower.

Optionally, the apparatus of any embodiment described herein is adapted to perform the method of any embodiment described herein. In turn, the method of any embodiment described herein may use the apparatus of any embodiment described herein.

According to an aspect, a system comprising the apparatus according to any embodiment described herein and a wire as the signal source is provided. Therein, the wire may be a guide wire arranged within an area delimited by a boundary wire, or the boundary wire.

The system may further comprise a signal generator adapted to send burst signals through the signal source.

By this, a method, apparatus and system are provided that allow an improved signal interference rejection.

BRIEF DESCRIPTION OF DRAWINGS

The invention is now described, by way of example, with reference to the accompanying drawings, in which:

FIG. 7 shows different signals detected by sensors of the robotic mower.

FIG. 8 shows a method for controlling an apparatus such as the robotic mower.

DESCRIPTION OF EMBODIMENTS

In the following, a detailed description of exemplary embodiments for controlling an apparatus in the form of a robotic mower 2 using wires 4, 8 as signal source according to the present disclosure will be presented.

Figure 1:
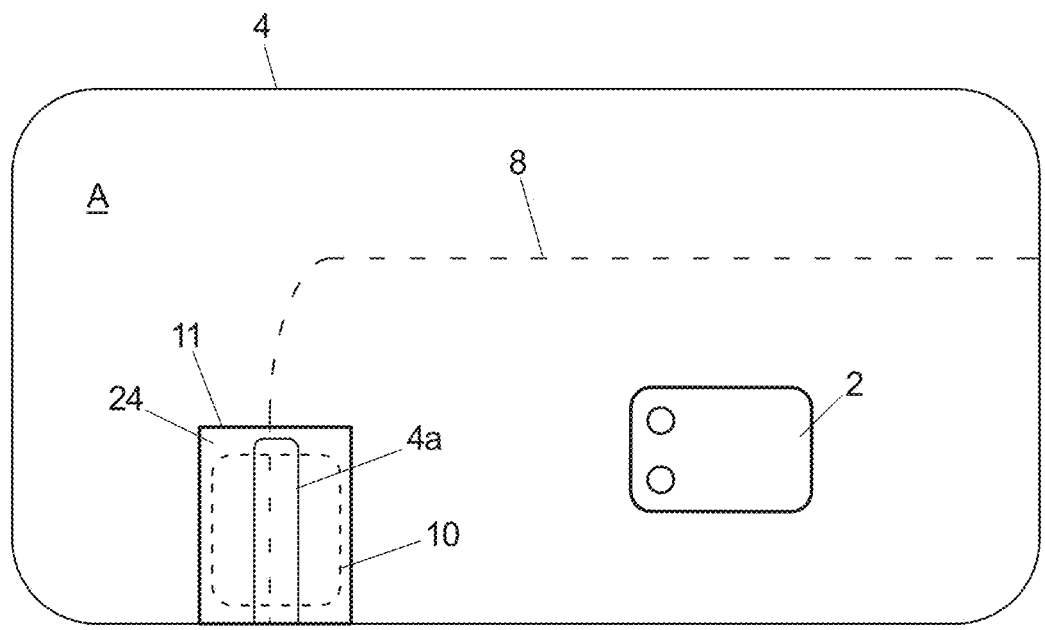
FIG. 1 is a schematic view of a robotic mower system.

FIG. 1 shows a schematic overview of a system controlling the robotic mower 2 by means of a guide wire 8 and/or by means of a boundary wire 4. The robotic mower 2, or as it also may be called a self-propelling lawnmower, is battery powered and needs to be recharged at regular intervals. The robotic mower 2 is during operation configured to move across an area A surrounded by the boundary wire 4. As is obvious the robotic mower 2 is depicted somewhat enlarged for the sake of clarity. The boundary wire 4 may be configured in many different ways, such that it delimits the area A within which the robotic mower 2 is allowed to move. The boundary wire 4 is preferably provided under the ground in the lawn, such that is not visible, but may also be provided on or above the ground. The boundary wire 4 could be an ordinary copper wire of single-core type. There are of course also other options, which are well-known by a person skilled in the art, such as multi stranded wire types. As may be seen in FIG. 1 the boundary wire 4 makes a loop 4a in the charging station 11. This loop 4a is used to guide the robotic mower 2 into charging contact with the charging station 11.

The system also comprises the charging station 11 mentioned above. The charging station itself 11 may be seen as the place where the charging of the robotic mower 2 takes place, and could for an example be provided with a charging station plate 24 onto which the robotic mower 2 is guided when performing docketing. Further, there is provided a charging station loop 10 at the charging station 11. The charging station loop 10 is entirely arranged at the charging station 11, more specifically, mounted on the charging station plate 24.

A system according to the present disclosure may also comprise one or more guide wires 8. A guide wire 8 is a wire that the robotic mower 2 may follow when returning to the charging station 11, when exiting the charging station 11 to start a mowing cycle and/or to move along a way that is otherwise difficult to find. The robotic mower 2 may also be adapted to follow the boundary wire 4 back to the charging station 11 and/or to exit the charging station 11 to start a mowing cycle.

The boundary wire 4, the charging station loop 10 and the one or more guide wires 8 are all connected to a signal generator which feeds each wire and loop with a, particularly wire-specific, current signal, in particular an Alternating Current, AC, signal, such that the robotic mower 2 may recognize which wire or loop it is detecting when it is within sensing distance. In general, the robotic mower 2 may be adapted to detect magnetic fields of the different signal wires.

Figure 2:
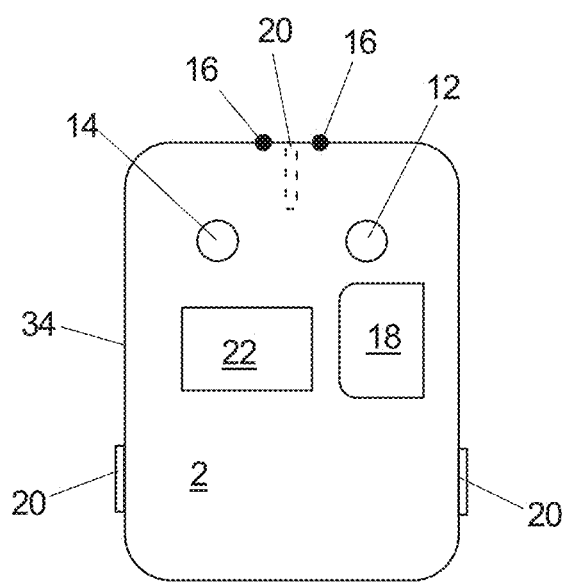
FIG. 2 is a schematic view of an exemplary embodiment of the robotic mower.

Turning now to FIG. 2, an exemplary embodiment of the robotic mower 2 will be closer described. The robotic mower 2 comprises a control unit 22, wheels 20, at least two sensors 12, 14, in particular two sensors 12, 14, optionally three or four sensors, and a battery 18. The sensors 12, 14 each are adapted to sense magnetic fields. Optionally, the robotic mower 2 comprises exactly two sensors 12, 14. The control unit 22, which will be closer described in conjunction with FIG. 4, comprises a processor 80 for controlling the movement of the robotic mower 2. When the robotic mower 2 is in operation, the sensors 12, 14 can sense a magnetic field that is generated in the boundary wire 4, the charging station loop 10 and/or the one or several guide wires 8. The signals of the different wires 4, 8 and wire loop 10 may be encoded differently. The sensed magnetic field, i.e. signal, is decoded in the control unit 22 to determine from which loop or wire it was received. The robotic mower 2 further comprises charging connectors 16.

It is worth noting that the robotic mower 2 has a forward-rearward axis along which the robotic mower 2 moves when it drives straight ahead or straight backwards. In the present example, the robotic mower 2 has a longitudinal extension in accordance with the forward-rearward axis. The two sensors 12, 14 are arranged at, e.g. fixed with respect to, a main body 34 of the robotic mower 2 displaced to one another in a direction orthogonal to the forward-rearward axis. In this example, the sensors 12, 14 are arranged in a front region of the robotic mower 2 and could be referred to as front sensors 12, 14. Two rear sensors may optionally be provided at the rear of the robotic mower 2 and arranged displaced to one another in a direction orthogonal to the forward-rearward axis.

Figure 3:
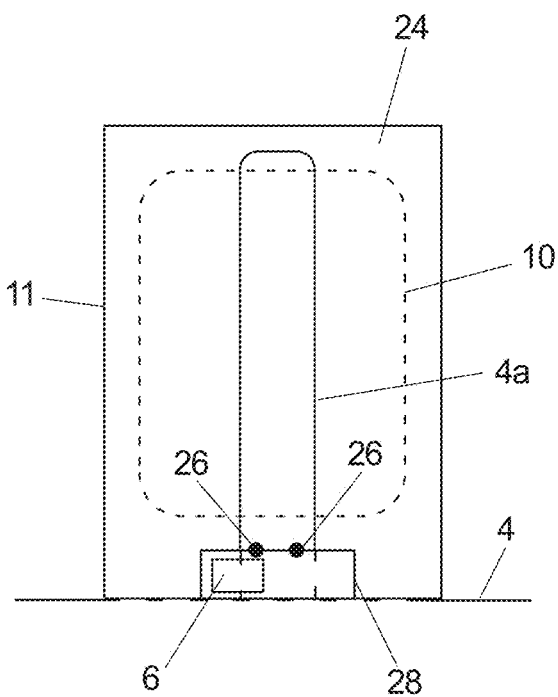
FIG. 3 is a schematic view of an exemplary embodiment of a charging station of the robotic mower system.

FIG. 3 shows an exemplary embodiment of the charging station 11. The charging station 11 comprises the charging station plate 24 at which the charging station loop 10, which can also be referred to as far-field loop, and the boundary wire loop 4a, which may also be referred to as near-field loop, are arranged. The charging station 11 further comprises the signal generator 6. As shown in FIG. 3, the charging station 11 comprises charging connectors 26 which are arranged so as to be contacted by the charging connectors 16 of the robotic mower 2 when docking into the charging station 11. The charging connectors 26 are mounted on a tower 28 of the charging station 11.

Figure 4:
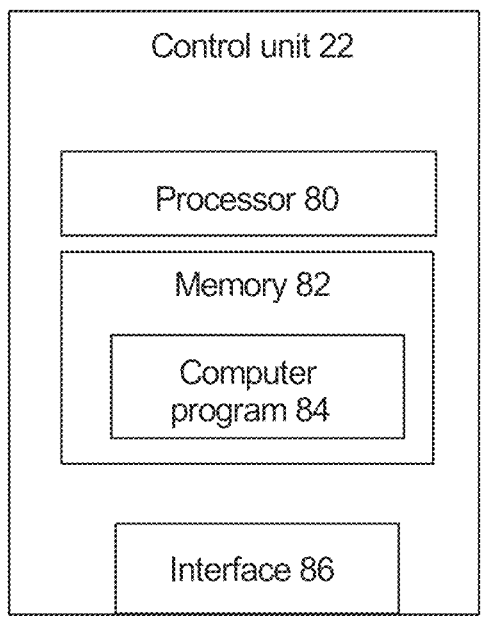
FIG. 4 is a schematic block diagram of a control unit in the robotic mower.

With reference to FIG. 4, the control unit 22 of the robotic mower 2 will be closer described. The control unit 22 comprises, as mentioned above, the processor 80 and a memory 82. The memory 82 may comprise a computer program 84 comprising computer program code, i.e. instructions. The computer program code is adapted to implement method steps performed by the robotic mower 2 when the code is executed on the processor 80. The control unit 22 further comprises an interface 86 for communication with the sensors 12, 14, and one or more motors that operate(s) the robotic mower 2, in particular a motor for driving a blade which will be described below with reference to FIG. 6. The control unit 22 is adapted to receive, store and process signals from the sensors 12, 14.

The processor 80 may comprise a single Central Processing Unit (CPU), or could comprise two or more processing units. For example, the processor 80 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 80 may also comprise a storage for caching purposes.

Figure 5:
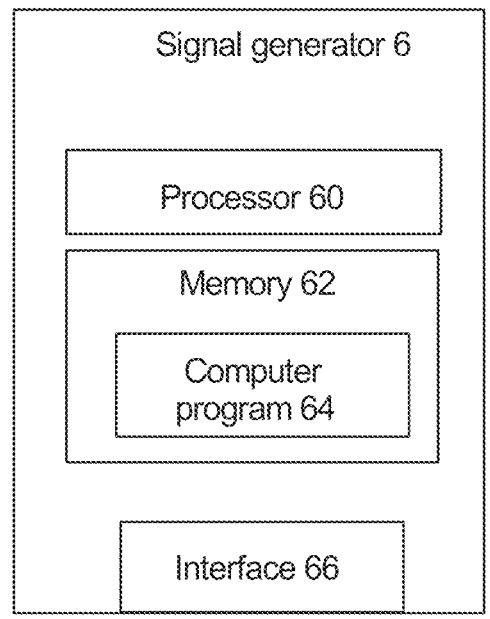
FIG. 5 is a schematic block diagram of a signal generator.

FIG. 5 depicts the signal generator 6, which also comprises a processor 60 and a memory 62. The memory 62 may comprise a computer program 64 comprising computer program code, i.e. instructions. The computer program code is adapted to implement method steps performed by the signal generator 6 when the code is executed on the processor 60. The signal generator 6 further comprises an interface 66 for transmitting the generated, e.g. AC, signals to the boundary wire 4, charging station loop 10 and guide wire or wires 8, particularly as burst signals. Correspondingly, at least one wire or wire loop 4, 8, 10, or all of the described wires 4, 8 and loop 10, may be fed with burst signals by the signal generator 6, wherein two consecutive bursts are spaced in time.

The processor 60 may comprise a single Central Processing Unit (CPU), or could comprise two or more processing units. For example, the processor 60 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 60 may also comprise a storage for caching purposes.

Figure 6:
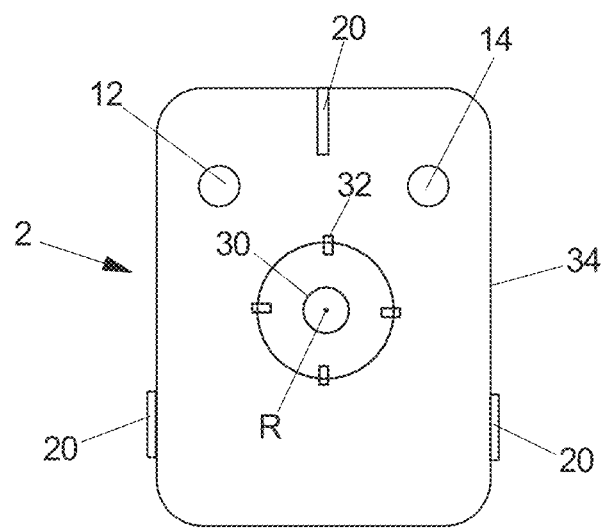
FIG. 6 shows the robotic mower from below.

As shown in FIG. 6, the robotic mower 2 comprises at least one blade 32 to cut the lawn, e.g., two, three or four blades 32. The, or each, blade 32 may be elongate, have the shape of a disc or other shapes. In the example of FIG. 6, the robotic mower 2 comprises a cutting disc on which a plurality of blades, namely four, alternatively three or two, blades 32 are mounted. The blade(s) 32 is/are rotatable around a rotational axis R with respect to a main body 34 of the robotic mower 2. The blade 32 is rotatable with respect to the main body 34 of the robotic mower 2 by means of a motor 30, which is an electric motor in this example and supplied with energy from the battery 18. In the example of FIG. 6, the cutting disc is rotatable by means of the motor 30 so as to rotate the blades 32 mounted to the cutting disc. The first and second sensors 12, 14 are arranged in the same distance to the rotational axis R. The first and second sensors 12, 14 are arranged in the same plane. Optionally, an angle formed by the two sensors 12, 14 and the rotational axis R is 90 degrees, or 75 degrees, or 100 degrees, or within the range of 45 degrees to 150 degrees, particularly within the range of 75 to 100 degrees.

The operation of the motor 30 creates time-varying electromagnetic fields that interfere with the signals emitted by a wire 4, 8 or loop 10 being in sensing distance. Further, also the blade(s) 32 may interfere with these signals due to its permittivity. The blade(s) 32 may optionally be made of a magnetic or magnetized material and interfere with said signals for this reason when rotating.

FIG. 7 illustrates the amplitude of different signals S1, S2, S1', S2' versus time t and thus for a plurality of points in time. A first signal S1 detected by the first sensor 12 is shown as the uppermost signal. The second signal S2 from above is detected using the second sensor 14. Approximately in the middle of the time span shown for the illustration there is a burst signal from a wire 4, 8 or loop 11, e.g., from the boundary wire 4. The burst signal is detected both by the first and second sensors 12, 14 at the same time.

Both sensors 12, 14, however, also capture other interfering signal components, particularly from the motor 30 and/or the blade(s) 32. The motor 30 and blade(s) 32 can also be referred to as active device interfering with the signals S1, S2 detectable by the sensors 12, 14. By rotating with a certain rotational speed, the motor 30 and/or blade(s) 32 are the source for a periodic signal component in the signals S1, S2 detected by the sensors 12, 14. By this, the signal bursts are altered and the quality of their reception is degraded.

In order to reject the interfering signal components, the robotic mower 2 is adapted to detect, by means of the sensors 12, 14, the signals S1, S2 including the burst signals from, e.g., the boundary wire 8 as signal source at different points in time, particularly continuously. The robotic mower 2 is further adapted to store data indicative for the detected signals S1, S2 in the memory 82, to compare signal amplitude values determined based on the data indicative for the signals S1, S2 stored in the memory 84 of three different points in time t1, t2, t3 with one another to differentiate the signal values by sorting them into a low signal value, an intermediate signal value and a high signal value, to subtract the intermediate signal value from a current signal value detected by means of the sensors 12, 14 to obtain at least one processed signal S1', S2' value and to control its operation based on the processed signal S1', S2' value.

The amplitude values of the processed first signal S1' and the processed second signal S2' versus time is shown in the third and fourth row of FIG. 7. It can be directly seen that the interfering signal components have been effectively subtracted.

A particularly effective implementation of the interference rejection is described in the following.

The control unit 22 determines the rotational speed of the blade(s) 32, e.g., as rotations per minute, RPM. By this, the interfering signal repetition rate is determined by the control unit 22 and known to the control unit 22.

Next, the control unit 22 calculates a first time offset T1 as the time for one complete revolution of the blade(s) 32, and a second time offset T2 as the time difference between the arrival of one blade 32 at the first sensor 12 and at the second sensor 14. In one embodiment, there are four blades located on the cutting disc, the second time offset T2 may be approximately quarter revolution of the blades 32.

Using the signals S1, S2 from both sensors stored in the memory 84 as corresponding data, three signal values D1, D2, D3 are extracted by the control unit 22 from this data from the following points in time before a current time T: a first point in time t1 is at the first time offset T1 before the current time, t1=T-T1; a second point in time t2 is at the second time offset T2 before the current time T, t2=T-T2; and a third point in time t3 is at the first time offset T1 plus the second time offset T2 before the current time T, t3=T-T1-T2. A first signal value D1 is determined as the amplitude of the first signal S1 at the first point in time t1, D1=S1 (*t*1). A second signal value D2 is determined as the amplitude of the second signal S2 at the second point in time t2, D2=S2 (*t*2). A third signal value D3 is determined as the amplitude of the second signal S2 at the third point in time t3, D3-S2 (*t*3). The three signal values D1, D2, D3 are sorted by the control unit 22 with respect to their value. The intermediate value M among these is selected as being most likely free of any burst signal, so that it is suited as a baseline. Using this intermediate value M the induced interference component can be removed by subtracting the intermediate value from the first signal S1 value at the current time T to obtain a processed signal S1' value, S1'(T)=S1(T)−M. A corresponding calculation may be performed using the second signal S2. The control unit 22 samples the sensor 12, 14 readings with a given sample rate, and over the time the above calculation of the processed signal S1' value is repeated for each sample at the respective current time T. For example, when the latest signal samples are stored in the memory 84, the oldest samples are removed from the memory 84. The control unit 22 may be adapted to store the signal data within a certain period of time. The result are the first and second processed signals S1', S2' shown in FIG. 7. Using these (or one thereof), the robotic mower 2 is operated, particularly navigated. This allows a strongly improved precision of the operation. Further, it is possible to arrange the sensors 12, 14 closer to the motor 30 and blade 32. By this it is also possible to reduce the size of the robotic mower 2.

The interfering signal component is periodic and repeats after one revolution of the blade 32 corresponding to the first time offset T1. Further, due to their displaced arrangement, the signals recorded by the two sensors 12, 14 are offset by the second time offset T2. In the example of FIG. 7 the second signal S2 is inverted with respect to the first signal S1 due to an inverted orientation of the second sensor 14 with respect to the first sensor 12. In this case the second signal S2 values may be multiplied by −1 in the above calculation. Alternatively, both sensors 12, 14 are arranged with the same orientation. The time offset between two consecutive burst signals from the boundary wire 4 (or other wire 8 or wire loop 10) is greater than the first time offset T1. That is, the wires 4, 8 and wire loop 11 are only active at a portion of the time, e.g., between 1% to 10% of the time, e.g., at about 4% of the time. The noise signals, however, are continuously active while the motor 30 is active.

Thus, it can be seen that at any current time T only the signal value D1, D2, D3 of one of the three points in time t1, t2, t3 may comprise a contribution of a burst signal. This one of the three signal values D1, D2, D3 most likely has the highest or lowest amplitude while the intermediate one of the three signal values D1, D2, D3 most likely has no contribution of a burst signal and therefore qualifies to remove the interference signal component.

To provide an illustrative example, assume the three signal values are as follows: D1=45, D2=33, D3=34. The intermediate signal value sample is determined to be the third signal value D3=34.

It is worth noting that in general the first time offset T1 may be the time of an integer number of complete revolutions of the blade, e.g., 1, 2, 3 or more. T1 can generally be determined based the RPM of the blade 32 and T2 can generally be determined from the fixed relative arrangement of the sensors 12, 14 with respect to the rotational axis R. For example, a signal of the first sensor 12 is cleaned up, e.g., an interference is removed, by finding a time-delayed copy of an interference on the signal of the second sensor 14, and subtracting it from the signal of the first sensor 12. Alternatively or in addition, a signal of the second sensor 14 may be cleaned up, e.g., an interference is removed, by finding a time-delayed copy of an interference on the signal of the first sensor 12, and subtracting it from the signal of the second sensor. The interference may be the same every revolution of the blade 32 or cutting disc.

FIG. 8 shows a method for controlling an apparatus, e.g., the robotic mower 2 described above, comprising at least two sensors 12, 14, and an active device 30, 32 interfering with signals detectable by the at least two sensors 12, 14. The method comprises the following steps.

Step S101: Detecting, by means of the at least two sensors 12, 14, signals S1, S2 at different points in time, the signals S1, S2 including burst signals from a signal source, e.g., the boundary wire 4.

Step S102: Storing data indicative for the detected signals S1, S2 in a memory 82. For this, a FIFO may be used.

The active device 30, 32 may comprise a rotatable component, e.g., the blade 32, being rotatable about the rotational axis R, and the method optionally comprises step S103: Determining a rotational speed of the rotatable component. This may be done, e.g., using the detected signals S1, S2 and/or based on set points defined in the control unit 22.

Step S104: Comparing signal values determined based on the data indicative for the signals S1, S2 stored in the memory 84 of three different points in time t1, t2, t3 with one another to sort the signal values into a low signal value, an intermediate signal value and a high signal value. The three different points in time t1, t2, t3 may be calculated based on the determined rotational speed and/or using the first time offset T1 and the second time offset T2.

Step S105: Subtracting the intermediate signal value from a current signal value detected by means of at least one of the at least two sensors 12, 14 to obtain at least one processed signal S1', S2' value.

Step S106: Controlling operation of the apparatus, e.g., the robotic mower 2, based on the processed signal S1', S2' value.

Some or all of these steps may be iteratively repeated, e.g., at a given sample rate, in particular steps S104 and S105.

For example, the computer program 84 of the control unit 22 may comprise instructions that, when executed by the processor 80 cause the robotic mower 2 to perform the above method.

Although the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

LIST OF REFERENCE NUMERALS 2 robotic mower (apparatus)
4 boundary wire
4a boundary wire loop
6 signal generator
8 guide wire
10 charging station loop
11 charging station
12 sensor
14 sensor
16 charging connector
18 battery
20 wheel
22 control unit
24 charging station plate
26 charging connector
28 tower
30 motor
32 blade
34 main body
60 processor
62 memory
64 computer program
80 processor
82 memory
84 computer program
A area
R rotational axis
S1, S2 signal
S1', S2° processed signal
T1, T2 time offset

The invention claimed is:

1. A method for controlling an apparatus comprising at least two sensors, and an active device interfering with signals detectable by the at least two sensors, the method comprising:
   detecting, by means of the at least two sensors, signals at different points in time, the signals including burst signals from a signal source,
   storing data indicative for the detected signals in a memory,
   comparing signal amplitude values determined based on the data indicative for the signals stored in the memory of three different points in time with one another to differentiate the signal amplitude values into a low signal amplitude value, an intermediate signal amplitude value and a high signal amplitude value,
   subtracting the intermediate signal amplitude value from the low signal amplitude value and the high signal amplitude value detected by means of at least one of the at least two sensors to obtain at least one processed signal amplitude value and
   controlling operation of the apparatus based on the processed signal.

2. The method according to claim 1, wherein the active device comprises a rotatable component being rotatable about a rotational axis, and wherein the method further comprises determining a rotational speed of the rotatable component.

3. The method according to claim 2, wherein the rotatable component is a blade and the active device comprises a motor to rotate the blade.

4. The method according to claim 3, further comprising determining a first time offset and a second time offset smaller than the first time offset.

5. The method according to claim 4, wherein the active device creates a periodic interference signal.

6. The method according to claim 5, wherein the at least two sensors comprise a first sensor and a second sensor and the first time offset is the time of one complete revolution of the rotatable component about the rotational axis, and the second time offset is the time to rotate a portion of the rotatable component from being closest to the first sensor to being closest to the second sensor.

7. The method according to claim 6, wherein the three different points in time comprise a first point in time at the first time offset before a current time, a second point in time at the second time offset before the current time, and a third point in time at the first time offset plus the second time offset before the current time.

8. The method according to claim 7, wherein the compared signal amplitude values comprise a first signal amplitude value determined at the first point in time, a second signal amplitude value determined at the second point in time, and a third signal amplitude value determined at the third point in time.

9. The method according to claim 8, wherein the first signal amplitude value is determined using the first sensor, the second signal amplitude value is determined using the second sensor, and the third signal amplitude value is determined using the second sensor.

10. The method according to claim 9, wherein the signal amplitude values are signal strengths amplitude of the corresponding signals at the respective points in time.

11. An apparatus comprising at least two sensors and an active device interfering with signals detectable by the at least two sensors, the apparatus being adapted to:
   detect, by means of the at least two sensors, signals at different points in time, the signals including burst signals from a signal source,
   store data indicative for the detected signals in a memory,
   compare signal amplitude values determined based on the data indicative for the signals stored in the memory of three different points in time with one another to differentiate the signal amplitude values into a low signal amplitude value, an intermediate signal amplitude value and a high signal amplitude value,
   subtract the intermediate signal amplitude value from the low signal amplitude value and the high signal amplitude value detected by means of at least one of the at least two sensors to obtain at least one processed signal amplitude value and
   control its operation based on the processed signal.

12. The apparatus according to claim 11, wherein the at least two sensors comprise a first sensor and a second sensor, and each of the first and second sensors is adapted to sense a magnetic field.

13. The apparatus according to claim 12, wherein the apparatus comprises a main body, and the first sensor and the second sensor are arranged at the main body displaced with respect to one another.

14. The apparatus according to claim 13, wherein the active device comprises a component being rotatable about a rotational axis, wherein the first and second sensors are arranged so that the rotational axis and the first and second sensors define a quarter circle or less than a quarter circle of a circle around the rotational axis.

15. The apparatus according to claim 14, wherein the active device comprises a motor and a blade rotatable by the motor.

16. The apparatus according to claim 15, wherein the blade comprises a magnetic material.

17. The apparatus according to claim 16, wherein the apparatus is a robotic mower.

18. A system comprising the apparatus according to claim 11, and a wire as the signal source.

19. The system according to claim 18, further comprising a signal generator adapted to send burst signals through the signal source.

* * * * *